United States Patent
Adogla et al.

(10) Patent No.: US 9,515,882 B2
(45) Date of Patent: *Dec. 6, 2016

(54) MANAGING IMAGING OF COMPUTING DEVICES

(71) Applicant: Amazon Technologies, Inc., Reno, NV (US)

(72) Inventors: Eden G. Adogla, Seattle, WA (US); Pradeep Vincent, Kenmore, WA (US); Benjamin E. Howard, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/262,218

(22) Filed: Apr. 25, 2014

(65) Prior Publication Data
US 2014/0237088 A1 Aug. 21, 2014

Related U.S. Application Data

(63) Continuation of application No. 13/167,553, filed on Jun. 23, 2011, now Pat. No. 8,713,135.

(51) Int. Cl.
*G06F 15/16* (2006.01)
*H04L 12/24* (2006.01)
*G06F 9/445* (2006.01)
*G06F 9/50* (2006.01)
*H04L 29/08* (2006.01)
*H04L 12/26* (2006.01)

(52) U.S. Cl.
CPC .............. *H04L 41/0853* (2013.01); *G06F 8/63* (2013.01); *G06F 9/5061* (2013.01); *H04L 43/045* (2013.01); *H04L 67/30* (2013.01); *H04L 67/306* (2013.01); *Y02B 60/183* (2013.01)

(58) Field of Classification Search
CPC .. H04L 41/0863; H04L 41/0853; H04L 67/30; H04L 67/306; H04L 43/045; G06F 8/63; G06F 9/5061; Y02B 60/183
USPC .......................... 709/220, 224, 221; 345/619
See application file for complete search history.

(56) References Cited

U.S. PATENT DOCUMENTS

| | | | |
|---|---|---|---|
| 7,111,055 B2 | 9/2006 | Falkner | |
| 7,356,679 B1 | 4/2008 | Le et al. | |
| 7,653,894 B2 | 1/2010 | Iszlai et al. | |
| 7,743,242 B2 | 6/2010 | Oberhaus et al. | |
| 7,797,525 B2 | 9/2010 | Lee et al. | |
| 8,713,135 B1 * | 4/2014 | Adogla | H04L 41/0853 709/220 |
| 2008/0183837 A1 | 7/2008 | Lee et al. | |

* cited by examiner

*Primary Examiner* — Jungwon Chang
(74) *Attorney, Agent, or Firm* — Knobbe, Martens, Olson & Bear, LLP (57) ABSTRACT

Systems and methods for managing imaging of computing devices are provided. A device image manager enables selection of one or more device images on the basis of various computing device criteria. The device image manager may obtain hardware qualification information associated with one or more device images, and obtain device configuration information associated with a computing device. The device image manager may select a set of appropriate device images for the computing device based on the hardware qualification information, device configuration information, or various device image selection criteria.

20 Claims, 7 Drawing Sheets

MANAGING IMAGING OF COMPUTING DEVICES

CROSS-REFERENCE TO RELATED APPLICATION

This application is a continuation of U.S. patent application Ser. No. 13/167,553, entitled MANAGING IMAGING OF COMPUTING DEVICES, and filed Jun. 23, 2011, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, individual computing devices within a data center may be configured to provide a variety of functionalities according to the requirements of the data center. For example, different operating systems, software, or operating system configurations may enable a computing device to provide different desired functionalities, or to provide similar functionalities more efficiently. In many cases, different physical computing devices may require different operating systems, software, or operating system configurations based on a hardware configuration or hardware benchmark. In other cases, it may be desirable to assign a computing device a particular operating system, software configuration, or operating system configuration based on a logical location within a network or a physical location within a data center. The configuration of a computing device is generally referred to as provisioning and the modification of a previous configuration with an updated configuration is generally referred to as reprovisioning. Reprovisioning a computing device often requires a manual installation or configuration of an operating system and software by an engineer familiar with the computing device hardware and network requirements.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the provisioning of computing devices. Specifically, embodiments of computing device provisioning systems and methods are disclosed for managing preconfigured operating systems, software, or operating system configurations associated with one or more computing devices. For purposes of brevity, such preconfigured operating systems, software, or operating system configurations may be referred to herein as "device images." A device image manager is described herein that enables selection of one or more device images on the basis of various computing device criteria. In illustrative embodiments, the device image manager may obtain hardware qualification information associated with one or more device images, and may obtain device configuration information associated with a computing device. In one embodiment, device configuration information may consist of a device hardware profile, a device network profile, a device benchmark profile, or a device physical location profile corresponding to the computing device. Illustratively, the device image manager may select a set of appropriate device images for the computing device based on hardware qualification information, device configuration information, or various device image selection criteria.

Illustratively, these techniques thereby allow a physical computing device to be easily and rapidly configured for a designated purpose or anticipated purpose. The flexibility provided by the pre-identification of one or more appropriate device images allows for the easy subsequent selection of a device image tailored to provide a particular functionality or meet specific requirements. For example, a physical computing device configured to provide a first functionality may be automatically reprovisioned for another purpose based on device configuration information when a need arises. As a further example, a device administrator (e.g., a system engineer or data center manager) may utilize one or more embodiments of the invention to rapidly scale up or roll out specifically configured, new physical machines in a data center. The time saved may decrease downtime in a data center or other networked computing environment, and may allow for the management of a greater number of physical computing devices than would otherwise be possible.

In an illustrative embodiment, a data center may maintain a number of physical computing devices connected to a network. Illustratively, each physical computing device may provide any one or more of a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. In one embodiment, when the functional needs of the data center change or computing devices are added or modified, it may be desirable to provision or reprovision one or more computing devices in order to provide a different set of functionalities.

To determine the set of appropriate device images for a type of functionality or for a data center, a plurality of operating systems, software configurations, or operating system configurations may be initially configured for one or more target physical computing devices in an experimental setting and assembled into preconfigured device images. Illustratively, the initial configuration can be an iterative process in which various device images or device image configurations are loaded on target computing devices and tested. The results of the testing can generate one or more device images or device image configurations that may be qualified for particular purposes. To allow for the reuse of the qualified device images or device image configurations, the qualified device images may each be associated with hardware qualification information based on a device hardware profile or other configuration information that is taken from target physical device or target physical devices utilized in the qualification process.

By way of an illustrative example, an engineer may assemble a first set of device images configured for the hardware components of a first computing device, and a second set of device images configured for the hardware components of a second computing device. Illustratively, each device image may include a different configuration of operating system and software, and may be designed or configured to provide any one of a number of different functionalities when running on a physical computing device. In one embodiment, the initial configuration and assembling of device images may be performed manually by an engineer or data center manager. For example, the engineer/data center manager may utilize an iterative process for identifying and qualifying device images for an identified function. In another embodiment, the initial configuration and assembling of device images may be performed automatically or semi-automatically by an automatic provisioning process. The result of this initial configuration and assembly is a mapping or correspondence between a set of device images and hardware qualification information.

As will be explained in greater detail below, the mapping of the set of device images to hardware qualification information may be later utilized by a device image manager to select an appropriate device image for a particular physical computing device. In one embodiment, to gather information regarding the physical computing device, a device image manager in communication with one or more physical computing devices over a network or direct connection may cause the execution of a device configuration process on the one or more computing devices. In another embodiment, a device image manager may be a process running locally in the memory of a physical computing device, and may perform or cause the execution of a device configuration process or routine directly.

Illustratively, the device configuration process may obtain or determine device configuration information comprising one or more device profiles associated with the physical computing device, including, but not limited to a device hardware profile, a device network profile, a device benchmark profile, or a device physical location profile. In one embodiment, the device image manager may obtain or have access to the plurality of device images and associated hardware qualification information described above. The device image manager may compare the device images and associated hardware qualification information with the device configuration information to identify a set of device images appropriate for the physical computing device. In one embodiment, the device image manager may identify a set of device images consisting of a single device image appropriate for the physical computing device. In another embodiment, the device image manager may select a plurality of device images.

Upon the identification of one or more device images based on device configuration information, the device image manager may further receive input from a user (e.g., an engineer or data center manager) selecting one of the set of identified device images or providing other business logic for the selection of specific device images. In another embodiment, the device image manager may select a device image from the set of determined device images on the basis of other device image selection criteria such as a preference list. Subsequent to a device image being selected or identified, the device image manager may cause the physical computing device to obtain and load the selected device image. For example, a device image manager may pass an image loading process running on the physical computing device a reference, address, or pointer to a locally or remotely stored device image, or may manage the device image retrieval or loading process directly. Illustratively, the selected device image may be stored locally or remotely, by itself, or with a set of other device images. In one embodiment, loading the selected device image may require one or more reboots of the physical computing device. In another embodiment, the selected device image may be loaded using a fast reboot process or hot-swap process (e.g., kexec, etc.) that reduces or eliminates the need to reboot the physical computing device. Although various aspects of the present disclosure will be described with regard to illustrative examples and embodiments, one skilled in the art will appreciate that the disclosed embodiments and examples should not be construed as limiting.

Figure 1:
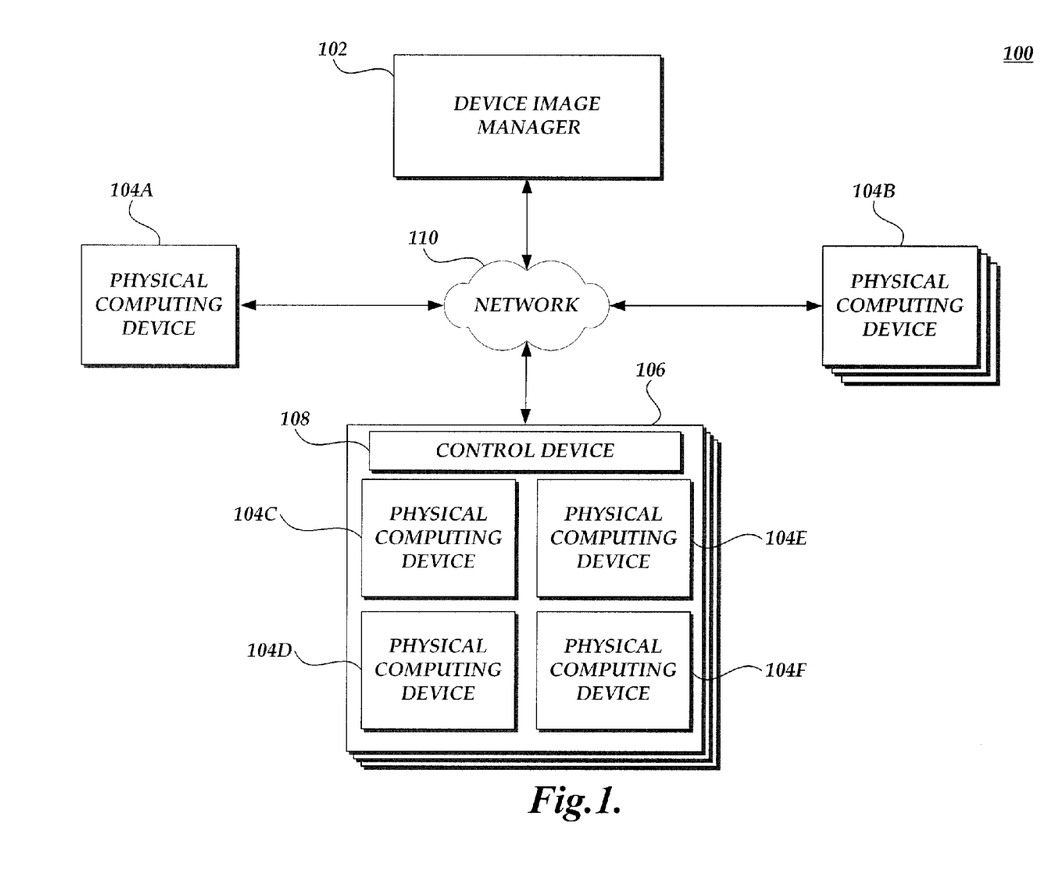
FIG. 1 is a block diagram depicting an illustrative environment for managing provisioning of computing devices, the environment including a number of physical computing devices, a number of rack computing devices, and a device image manager.

FIG. 1 is a block diagram depicting an illustrative environment for managing provisioning of computing devices, the environment including a number of computing devices, a control device for managing collections of physical devices, and a device image manager. The illustrated example depicts an illustrative networked computing environment 100 with multiple physical computing devices. One or more physical devices or components of the illustrative networked computing environment 100 are connected to a network 110. Illustratively, the network 110 may be a global internet or general communication network with one or more components external to the networked computing environment 100, or any private, semi-private, or public network. In one embodiment, one or more physical computing devices or components may be connected directly or through the network 110 through a physical medium such as wiring or cabling (e.g., Ethernet or coaxial cable, telephone line, serial cable, USB, etc.) or may be linked directly or through the network 110 by means of a wireless connection (e.g., Wi-Fi, WiMAX, Bluetooth, cellular network, etc.).

The illustrative networked computing environment 100 includes a number of physical computing devices 104A-104F and a device image manager 102 that executes on one or more computing systems. The networked computing environment 100 may further include one or more logical or physical collections 106 of physical computing devices 104C-104F. For example, the collection of physical computing devices 106 may include physical computing devices 104C-104F mounted on a rack and controlled by one or more control devices 108 to manage the collection 106 of physical computing devices. In another embodiment, the collection 106 of physical computing devices may by associated with a logical grouping of physical computing devices, such as a set of physical computing devices centrally managed by a control device 108 across a local or public network. Although for the purposes of example the device image manager 102 is depicted as independent of physical computing devices 104A-104F and control device 108 in illustrative FIG. 1, it should be appreciated that the device image manager 102 may be implemented or executed on any number of physical or logical computing systems.

In one embodiment, the device image manager 102 may execute on one or more physical computing devices 104A-104F. For example, each physical computing device 104A-104F may automatically or manually execute an instance of the device image manager 102 stored in local memory or on a local or remote storage device or component (not shown) in response to a predefined system event or a request or command by a device administrator. As another example, a device administrator may manually execute an instance of the device image manager 102 on a physical computing device 104A-104F from a USB key or other portable storage device. In another embodiment, the device image manager 102 may execute on a local or remote computing system different than physical computing device 104A-104F. For example, device image manager 102 may execute on the control device 108 in order to manage one or more rack mounted physical computing devices 104C-104F. As another example, the device image manager 102 may execute as a remote or distributed process on one or more physical or logical computing device connected to one or more physical computing device 104A-104F directly or over the network 110. It should be appreciated that, although the device image manager 102 is depicted for the purpose of example as a single logical component in illustrative FIG. 1, the routines and steps performed by device image manager 102 may be distributed among any number of components and executed in hardware or software.

Figure 2A:
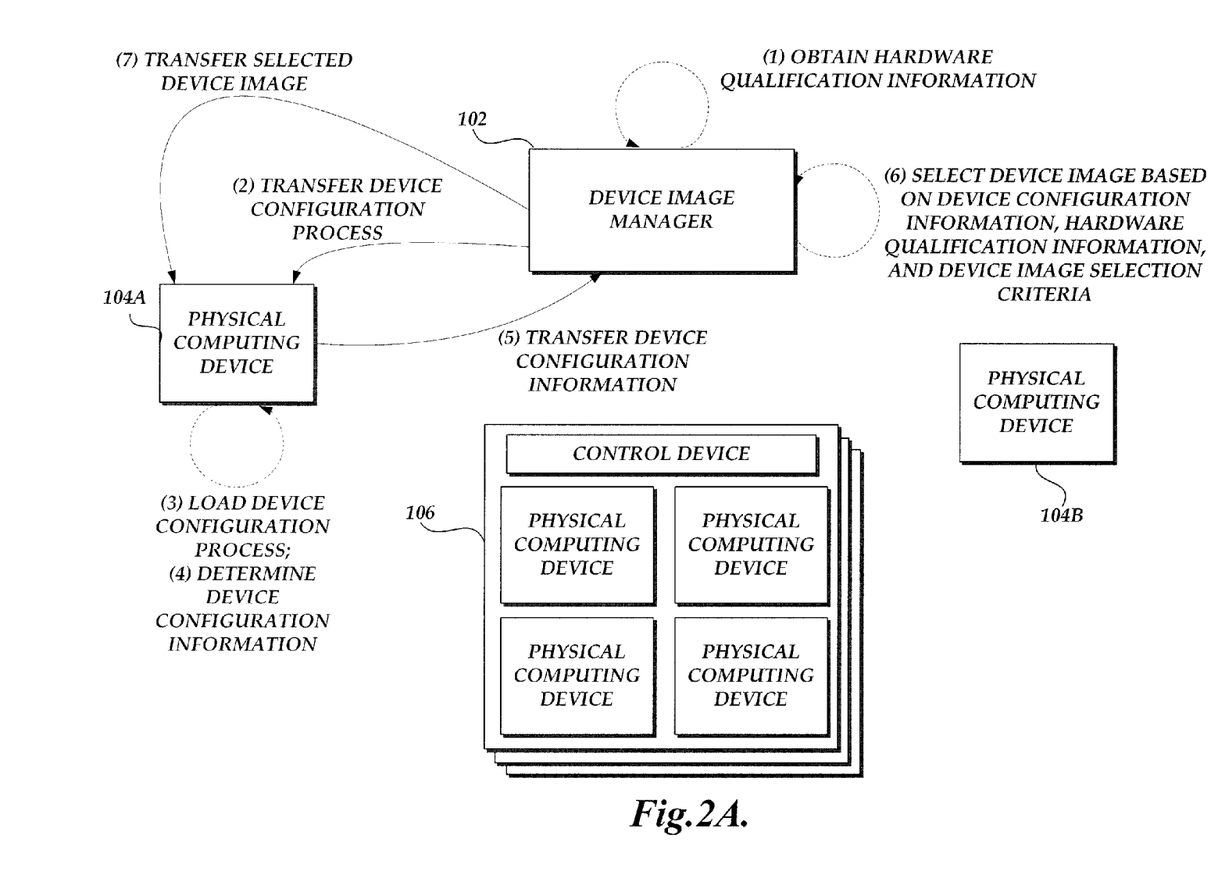
FIGS. 2A-2C are block diagrams of the provisioning management environment of FIG. 1 illustrating the provisioning of physical computing devices.
Figure 2B:
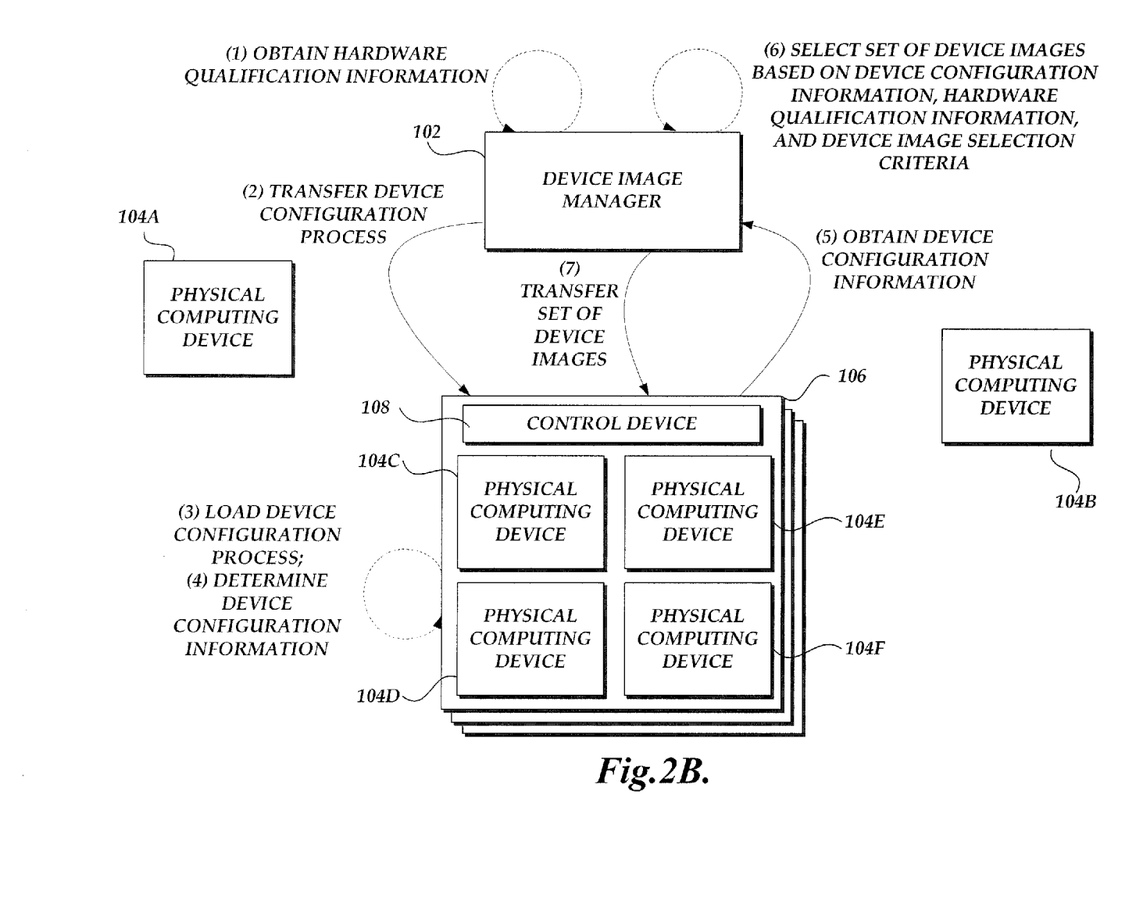
Figure 2C:
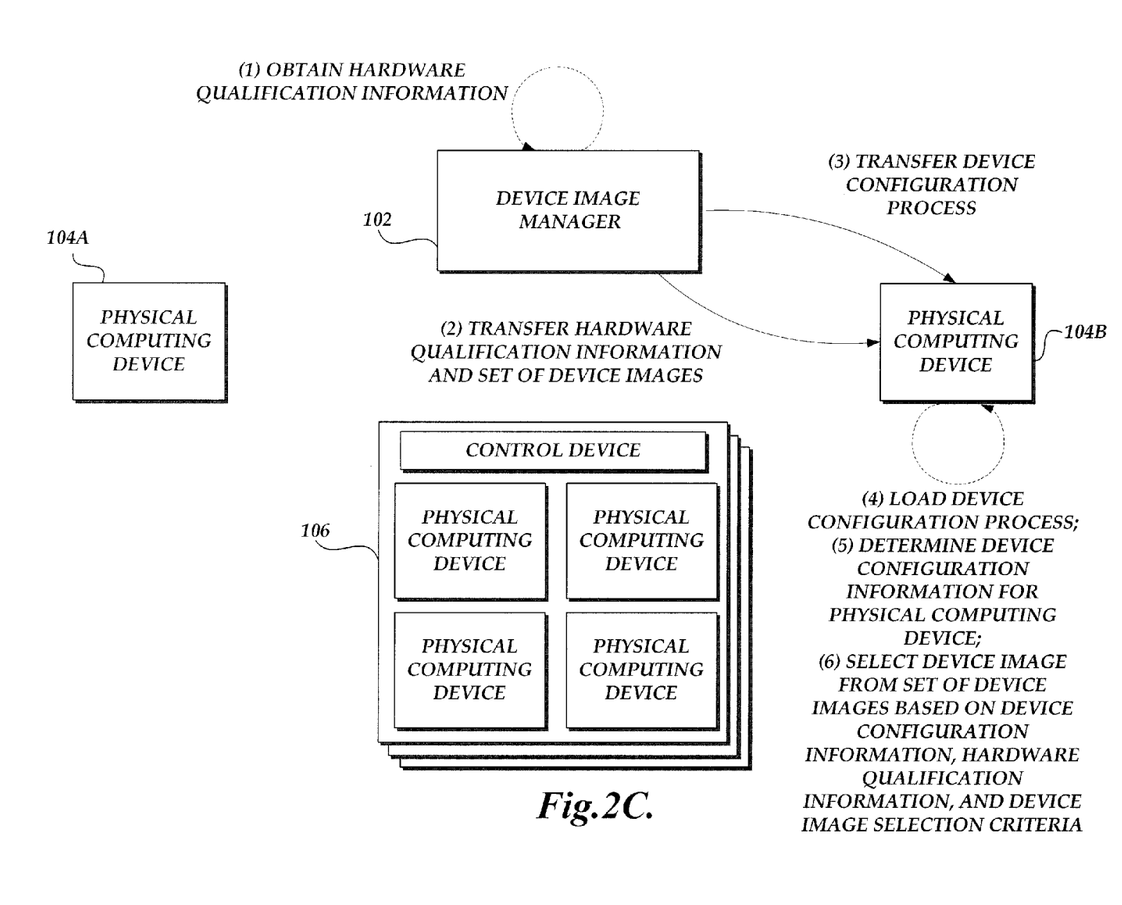

FIGS. 2A, 2B, and 2C are block diagrams of the networked computing environment of FIG. 1 illustrating the provisioning of physical computing devices. Referring first to FIG. 2A, an illustrative interaction of components of the networking computing environment 100 related to the provisioning a physical computing device 104A will be described. The device image manager 102 obtains hardware qualification information from local or remote data storage or a device administrator. As described above, the hardware qualification information may be associated with one or more device images, and may be based on one or more device profiles, such as a device hardware profile, a device network profile, a device benchmark profile, a device physical location profile, or any other configuration information associated with one or more physical computing devices.

Specifically, for the purposes of example, a device hardware profile may include information associated with a hardware component of a physical computing device. These hardware components may include, but are not limited to, a network interface controller (NIC), a central processing unit (CPU), a computing device basic input/output system (BIOS), computing device firmware, a motherboard, a daughterboard, an expansion board, a bus, a computer readable media drive, a memory, a storage device, a computer display, an input or output interface, or a computing device enclosure.

A device network profile or device physical location profile may include information associated with a logical or physical location in a network or data center, respectively. Illustratively, a logical or physical location may be inferred or otherwise determined from information, including, but not limited to, a physical network address (e.g., MAC address), a logical network address (e.g., a dynamic IP address or a or static IP address), a subnet, a network gateway, a domain name server, a network location, a number of hops to a network location, routing information, a logical or physical group identifier, a rack identifier, a serial number or ID corresponding to one or more components of the physical computing device, a data storage location, information identifying a device image manager 102, or any other information that may indicate or be used to infer a logical or physical location.

A device benchmark profile may include information associated with one or more performance benchmarks of a physical computing device or physical computing device component. Illustratively, benchmark information may be based on heuristics including but not limited to processor performance; energy usage; bus speed; drive or data storage component throughput or seek time; network bandwidth, throughput, or latency to one or more remote or local network locations; or other benchmark data associated with the physical computing device.

In one embodiment, the hardware qualification information may be generated or determined manually by an engineer or data center manager. In another embodiment, the initial configuration and assembling of device images may be performed automatically or semi-automatically by an automatic provisioning process. Although for the purposes of example, the device image manager 102 is depicted as obtaining hardware qualification information before a number of other logical steps or routines, it should be appreciated that hardware qualification information may be obtained any time before it is utilized by the device image manager 102 as described below.

Illustratively, after obtaining hardware qualification information, the device image manager 102 may transfer a device configuration process to physical computing device 104A. As discussed above, the device image manager 102 may transfer a device configuration process consisting of code or other information executable on the physical computing device 104A to generate or determine device configuration information associated with the physical computing device 104A. Illustratively, the device configuration process may be transferred from a remote device or location over the network 110 of FIG. 1, or may be transferred from a local storage device (e.g., a local hard drive or USB key). In another embodiment, a device configuration process may be preloaded or stored on the physical computing device 104A, and the device image manager 102 may transfer parameters or other configuration information to be used by the device configuration process, or may identify the local process or transfer nothing to the physical computing device 104A.

Upon receipt or command to execute, the physical computing device 104A may load and execute the device configuration process. Illustratively, the physical computing device 104A may load the device configuration process automatically in response to the device configuration process being transmitted, or in response to a command or request by the device image manager 102 or a device administrator. In one embodiment, loading the device configuration process may entail loading executable code from a local or network storage location. In a still further embodiment, the device image manager 102 may be running in the local memory of the physical computing device 104A, and may simply start a device configuration subroutine or process locally. In a still further embodiment, a device configuration process may already be loaded into the local memory of the physical computing device 104A, and the device image manager 102 may cause the already-loaded process to execute.

Subsequent to the configuration process being loaded and executed on the physical computing device 104A, the device configuration process may determine device configuration information associated with the physical computing device 104A. In one embodiment, device configuration information may be based on or include one or more device profiles, such as a device hardware profile, a device network profile, a device benchmark profile, or a device physical location profile, or other configuration information associated with the physical computing device 104A. Illustratively, the device configuration process may determine device configuration information by querying or identifying hardware components of the physical computing device, performing benchmarking or testing on the physical computing device, obtaining data previously generated or associated with the physical computing device, or inferring information based on any of the above or any other information associated with the physical computing device. The process of determining device configuration information may be guided by or based upon device provisioning preferences, which may include information identifying or interpretable to identify one or more profiles, types, or specific pieces of device configuration information for the device configuration process to obtain or determine. Illustratively, device provisioning preferences may be hardcoded or stored on the physical computing device 104A, included as part of the device configuration process, or made available to the device configuration process as a separate set of information or data.

As discussed above, device configuration information may be based on or include one or more device profiles, such as a device hardware profile, a device network profile, a device benchmark profile, or a device physical location profile. Illustratively, these device profiles may be defined in a similar manner as the device profiles discussed earlier with regards to hardware qualification information. In one embodiment, device profiles associated with device configuration information may parallel device profiles associated with hardware qualification information corresponding to one or more device images. In another embodiment, device profiles associated with device configuration information may include different information than one or more device profiles associated with hardware qualification information. In a still further embodiment, device configuration information may include other information about physical computing device 104A in addition or as an alternative to the one or more device profiles.

Subsequent to the device configuration process determining device configuration information regarding the physical computing device 104A, the device configuration information is transferred to the device image manager 102. Transferring device configuration information may include transmitting data comprising the device configuration information across a direct connection or network 110 of FIG. 1, transmitting or identifying a pointer or reference to a location of device configuration information stored on a storage device or computer memory, or any combination thereof.

Upon obtaining access to the device configuration information corresponding to the physical computing device 104A, the device image manager 102 may utilize the device configuration information to select a device image from a set of device images corresponding to hardware qualification information. In one embodiment, the device image manager 102 may compare device configuration information corresponding to the physical computing device 104A to the hardware qualification information directly in order to identify a first set of one or more device images capable of running on the computing device 104A. In a further embodiment, the device image manager 102 may narrow the first set of one or more device images down to a second set of one or more device images by comparing additional device configuration information to the hardware qualification information.

For example, the device image manager 102 may compare device configuration information corresponding to the physical computing device 104A to hardware qualification information associated with a group of fifty device images to identify an initial set of ten different device images that may run on the physical computing device 104A. In an alternate embodiment, the device image manager 102 may identify all device images as potentially able to run on the physical computing device 104A, or may skip the step entirely. For further example, the device image manager 102 may compare the device configuration information to hardware qualification information to narrow the initial set of device images down to a set of device images appropriate for the physical computing device 104A. For example, if device configuration information such as a device network profile associated with the physical computing device 104A indicates that the physical computing device 104A is located in a network subnet that is dedicated to servicing client DNS queries, a comparison of the device configuration information with the hardware qualification information may cause the device image manager 102 to identify three device images out of the initial set of ten that correspond to operating systems, software, or operating system configurations for responding to DNS queries.

By way of illustrative example, assume that device configuration information such as a device physical location profile associated with physical computing device 104A indicates that physical computing device 104A is located in a physical data center in an area with high energy costs. Based on a comparison of the device configuration information with the hardware qualification information, an illustrative device image manager 102 identifies two device images out of the initial set of ten that correspond to operating systems, software, or operating system configurations configured for low power usage. These identified device images may be subsequently loaded onto the physical computing device 104 by an administrator or automated process in order to keep down data center upkeep costs.

With reference to the previous example, in another application, assume that device configuration information such as a device benchmark profile associated with physical computing device 104A indicates that physical computing device 104A is associated with a high network latency to a particular group of network clients. In this example, based on a comparison of the device configuration information with the hardware qualification information, the device image manager 102 identifies one device image out of the initial set of ten that corresponds to an operating systems, software, or operating system configuration configured for long term backup or storage of content, rather than rapid service of content to the group of network clients. An administrator or process may subsequently load the identified device image with confidence that it is appropriate for the particular physical computing device 104A, allowing rapid scaling and roll out of the physical computing device.

As still another example, based on a comparison of the device configuration information with the hardware qualification information, a device image manager 102 may identify all ten of the initial set of qualified device images as potential images for physical computing device 104A. In this example, an administrator or subsequent automated process may later decide which of the device images should be loaded on the physical computing device 104A. Although the selection of a set of device images that may run on physical computing device 104A and the selection of a set of device images on the basis of other information associated with computing device 104A is described here for the purpose of example as two logical steps, it should be understood that the identification of one or more appropriate device images may be implemented or executed in one, two, or any other number of logical steps by device image manager 102.

Device image manager 102 may identify one, a subset, or all available device images on the basis of a comparison between device configuration information associated with physical computing device 104A and the hardware qualification information. In one embodiment, if device image manager 102 identifies a set of more than one device image on the basis of the comparison between the device configuration information and the hardware qualification information, device image manager 102 may cause the selection of one device image from the set of device images based upon additional device image selection criteria. The device image selection criteria may include, but is not limited to, a device image preference list giving a preference order in which to select device images, data from a central provisioning server (e.g., an up to date preference list, or current network configuration or network load data), an unweighted or weighted probabilistic distribution between device images, or any other criteria which may assist the device image manager 102 in selecting a device image for physical computing device 104A. In an alternative embodiment, the device image selection criteria may be evaluated by the physical computing device 104 upon receipt of a command to load an image.

Subsequent to device image manager 102 selecting a device image for physical computing device 104A, device image manager 102 may cause the selected device image to be transferred or loaded on physical computing device 104A. In one embodiment, the selected device image may be stored on a remote storage device and transferred over network 110 of FIG. 1 to physical computing device 104A. In another embodiment, the selected device image may be stored on a local storage device associated or connected to physical computing device, such as a local hard drive or USB key. In one embodiment, device image manager 102 may cause the transfer of the selected device image directly by means of a process executing on physical computing device 104A. In another embodiment, device image manager may cause the transfer of the selected device image as the result of a command sent to physical computing device 104A, or any other means.

With reference now to FIG. 2B, the figure depicts an illustrative process for provisioning a collection 106 of physical computing devices 104C-104F incorporating a control device 108. In various embodiments, collection 106 may include any combination of one or more logically grouped physical computing devices, such as a set of physical computing devices in a network subnet, or one or more physically grouped physical computing devices, such as a set of physical computing devices installed in a particular rack at a data center. It will be understood by one of skill in the relevant art that collection 106 may include any number of physical computing devices, and is not limited to four physical computing devices 104C-104F as depicted herein for the purposes of example. In one embodiment, collection 106 may include additional physical computing devices not being provisioned or reprovisioned during the illustrative process depicted herein. Illustratively, these additional physical computing devices may have been automatically or manually provisioned at an earlier point in time, or may await later provisioning (e.g., a backup device). As described above, steps or routines herein ascribed to device image manager 102 may be implemented on control device 108, or by any other logical or physical computing device or collection of components locally or remotely located.

Returning to FIG. 2B, the device image manager 102 obtains hardware qualification information for qualified device images from a local or remote data storage or device administrator. As described above with reference to FIG. 2A, the hardware qualification information may be associated with one or more device images, and may be based on one or more device profiles, such as a device hardware profile, device network profile, device benchmark profile, or device physical location profile, or other configuration information associated with one or more physical computing devices.

In one embodiment, the hardware qualification information may be generated or determined manually by an engineer or data center manager. In another embodiment, the initial configuration and assembling of device images may be performed automatically or semi-automatically by an automatic provisioning process. Although for the purposes of example, the device image manager 102 is depicted as obtaining hardware qualification information before a number of other logical steps or routines, it should be appreciated that hardware qualification information may be obtained any time before it is utilized by the device image manager 102 as described below.

Illustratively, after obtaining hardware qualification information, the device image manager 102 may transfer a device configuration process to the collection 106 of physical computing devices 104C-104F. As discussed above, the device image manager 102 may transfer a device configuration process consisting of code or other information executable on physical computing devices 104C-104F or control device 108 to generate or determine device configuration information associated with physical computing devices 104C-104F. Illustratively, the device configuration process may be transferred from a remote device or location over the network 110 of FIG. 1, or may be transferred from a local storage device (e.g., a local hard drive or USB key). In another embodiment, a device configuration process may be preloaded or stored on physical computing devices 104C-104F or control device 108, and the device image manager 102 may transfer parameters or other configuration information to be used by the device configuration process, or may identify the local process or transfer nothing to the physical computing devices 104C-104F or the control device 108.

Upon receipt or command to execute, physical computing devices 104C-104F or control device 108 may load and execute the device configuration process. Illustratively, physical computing devices 104C-104F or control device 108 may load the device configuration process automatically in response to the device configuration process being transmitted, or in response to a command or request by the device image manager 102 or a device administrator. In one embodiment, loading the device configuration process may entail loading executable code from a local or network storage location. In a still further embodiment, the device image manager 102 may be running in the local memory of physical computing devices 104C-104F or the control device 108, and may simply start a device configuration subroutine or process locally. In a still further embodiment, a device configuration process may already be loaded into the local memory of physical computing devices 104C-104F or the control device 108, and the device image manager 102 may cause the already-loaded process to execute.

Subsequent to the configuration process being loaded and executed on physical computing devices 104C-104F or the control device 108, the device configuration process may determine device configuration information associated with physical computing devices 104C-104F. In one embodiment, device configuration information may be based on or include one or more device profiles, such as a device hardware profile, a device network profile, a device benchmark profile, or a device physical location profile, or other configuration information associated with physical computing devices 104C-104F. Illustratively, the device configuration process may determine device configuration information by querying or identifying hardware components of the physical computing device, performing benchmarking or testing on the physical computing device, obtaining data previously generated or associated with the physical computing device, or inferring information based on any of the above or any other information associated with the physical computing device. The process of determining device configuration information may be guided by or based upon device provisioning preferences, which may include information identifying or interpretable to identify one or more profiles, types, or specific pieces of device configuration information for the device configuration process to obtain or determine. Illustratively, device provisioning preferences may be hardcoded or stored on physical computing devices 104C-104F or control device 108, included as part of the device configuration process, or made available to the device configuration process as a separate set of information or data.

As discussed above, device configuration information may be based on or include one or more device profiles, such as a device hardware profile, a device network profile, a device benchmark profile, or a device physical location profile. Illustratively, these device profiles may be defined in a similar manner as the device profiles discussed earlier with regards to hardware qualification information. In one embodiment, device profiles associated with device configuration information may parallel device profiles associated with hardware qualification information corresponding to one or more device images. In another embodiment, device profiles associated with device configuration information may include different information than one or more device profiles associated with hardware qualification information. In a still further embodiment, device configuration information may include other information about physical computing devices 104C-104F in addition or as an alternative to the one or more device profiles.

Subsequent to the device configuration process determining device configuration information regarding physical computing devices 104C-104F, the device configuration information is transferred to the device image manager 102. Transferring device configuration information may include transmitting data comprising the device configuration information across a direct connection or network 110 of FIG. 1, transmitting or identifying a pointer or reference to a location of device configuration information stored on a storage device or computer memory, or any combination thereof. In one embodiment, transferring device configuration information may include transferring a single set of information corresponding to multiple identical physical computing devices, or may include transferring multiple sets of information corresponding to one or more physical computing devices.

Upon obtaining access to the device configuration information corresponding to physical computing devices 104C-104F, the device image manager 102 may utilize the device configuration information to select a device image from a set of device images corresponding to hardware qualification information. In one embodiment, the device image manager 102 may compare device configuration information corresponding to physical computing devices 104C-04F to the hardware qualification information directly in order to identify a first set of one or more device images capable of running on one or more of physical computing devices 104C-04F. In a further embodiment, the device image manager 102 may narrow the first set of one or more device images down to a second set of one or more device images by comparing additional device configuration information to the hardware qualification information.

Device image manager 102 may identify one, a subset, or all available device images on the basis of a comparison between device configuration information associated with one or more of physical computing devices 104C-104F and the hardware qualification information. In one embodiment, if device image manager 102 identifies a set of more than one device image for one or more of physical computing devices 104C-104F, device image manager 102 may further cause the selection of one device image from the set of device images based upon additional device image selection criteria. The device image selection criteria may include, but is not limited to, a device image preference list giving a preference order in which to select device images, a real time or prior input from a device administrator (e.g., a network engineer, call center manager, or system administrator), data from a central provisioning server (e.g., an up to date preference list, or current network configuration or network load data), an unweighted or weighted probabilistic distribution between device images, or any other criteria which may assist the device image manager 102 in selecting a device image for physical computing device 104A. The subset of selected device images may include a single device image for each of physical computing devices 104C-104F, or may include a plurality of device images for use with one or more of physical computing devices 104C-104F.

Subsequent to device image manager 102 selecting a set of device images for physical computing devices 104C-104F, device image manager 102 may cause the selected device image to be transferred or loaded on one or more of physical computing devices 104C-104F or on control device 108. In one embodiment, one or more of the set of selected device images may be stored on a remote storage device and transferred over network 110 of FIG. 1. In another embodiment, one or more of the set of selected device images may be stored on a local storage device associated or connected to physical computing device, such as a local hard drive or USB key. In one embodiment, device image manager 102 may cause the transfer of one or more of the set of selected device images directly by means of a process executing on physical computing devices 104C-104F or control device 108. In another embodiment, device image manager may cause the transfer of one or more of the set of selected device images as the result of a command sent to one or more of physical computing devices 104C-104F or control device 108, or any other means.

In one embodiment, the selected set of device images may be transferred to physical computing devices 104C-104F or control device 108 as part of a device image caching process to be used during a later provisioning of one or more of physical computing devices 104C-104F. For example control device 108 may store the transferred set of device images in a local or remote storage location, and may cause a device image to be further transferred to or loaded on one or more of physical computing devices 104C-104F as the result of a later event or request.

With reference now to FIG. 2C, the figure depicts an illustrative process for provisioning a physical computing device 104B. The device image manager 102 obtains hardware qualification information from a local or remote data storage or a device administrator. As described above, the hardware qualification information may be associated with one or more device images, and may be based on one or more device profiles, such as a device hardware profile, a device network profile, a device benchmark profile, a device physical location profile, or any other configuration information associated with one or more physical computing devices.

As previously described, the hardware qualification information for qualified device images may be generated or determined manually by an engineer or data center manager. In another embodiment, the initial configuration and assembling of device images may be performed automatically or semi-automatically by an automatic provisioning process. Although for the purposes of example, the device image manager 102 is depicted as obtaining hardware qualification information before a number of other logical steps or routines, it should be appreciated that hardware qualification information may be obtained any time before it is utilized by the device image manager 102 as described below.

In one embodiment, after obtaining hardware qualification information, the device image manager 102 may cause the transfer a set of device images and corresponding hardware qualification information to the physical computing device 104B. In one embodiment, the set of device images or hardware qualification information may be stored on a remote storage device and transferred over the network 110 of FIG. 1 to the physical computing device 104B. In another embodiment, the set of device images or hardware qualification information may be stored on a local storage device associated or connected to the physical computing device 104B, such as a local hard drive or USB key.

Illustratively, the set of device images may correspond to a predetermined set of device images associated with the physical computing device 104B, or may correspond to a set of device images with no predetermined association to the physical computing device 104B. For example, the set of device images may correspond to a set of device images that have been predetermined to work on the hardware of the physical computing device 104B, or may correspond to a set of device images that may include device images that are not compatible with the physical computing device 104B. In one embodiment, the device image manager 102 may cause the transfer of the set of device images or hardware qualification information directly by means of a process executing on the physical computing device 104B. In another embodiment, device image manager may cause the transfer of the set of device images or hardware qualification information as the result of a command sent to the physical computing device 104B, or any other means. Illustratively, the set of steps or routines involved in causing the transfer of the set of device images and hardware qualification information may occur at any time before the hardware qualification information is used by the device configuration process as described below.

After causing the transfer of the set of device images and corresponding hardware qualification information, the device image manager 102 may transfer a device configuration process to physical computing device 104B. Illustratively, the device configuration process may manage the determination of device configuration information associated with physical computing device 104B, as well as any other device image identification and selection functionality provided by the device image manager 102 in FIGS. 2A and 2B above. In one embodiment, the device configuration process may include of code or other information executable on the physical computing device 104B to generate or determine device configuration information associated with the physical computing device 104B. Illustratively, the device configuration process may be transferred from a remote device or location over the network 110 of FIG. 1, or may be transferred from a local storage device (e.g., a local hard drive or USB key). In another embodiment, a device configuration process may be preloaded or stored on the physical computing device 104B, and the device image manager 102 may transfer parameters or other configuration information to be used by the device configuration process, or may identify the local process or transfer nothing to the physical computing device 104B.

Upon receipt or command to execute, the physical computing device 104B may load and execute the device configuration process. Illustratively, the physical computing device 104B may load the device configuration process automatically in response to the device configuration process being transmitted, or in response to a command or request by the device image manager 102 or a device administrator. In one embodiment, loading the device configuration process may entail loading executable code from a local or network storage location. In a still further embodiment, the device image manager 102 may be running in the local memory of the physical computing device 104B, and may simply start a device configuration subroutine or process locally. In a still further embodiment, a device configuration process may already be loaded into the local memory of the physical computing device 104B, and the device image manager 102 may cause the already-loaded process to execute.

Subsequent to the configuration process being loaded and executed on the physical computing device 104B, the device configuration process may determine device configuration information associated with the physical computing device 104B. In one embodiment, device configuration information may be based on or include one or more device profiles, such as a device hardware profile, a device network profile, a device benchmark profile, or a device physical location profile, or other configuration information associated with the physical computing device 104A. Illustratively, the device configuration process may determine device configuration information by querying or identifying hardware components of the physical computing device, performing benchmarking or testing on the physical computing device, obtaining data previously generated or associated with the physical computing device, or inferring information based on any of the above or any other information associated with the physical computing device. The process of determining device configuration information may be guided by or based upon device provisioning preferences, which may include information identifying or interpretable to identify one or more profiles, types, or specific pieces of device configuration information for the device configuration process to obtain or determine. Illustratively, device provisioning preferences may be hardcoded or stored on the physical computing device 104B, included as part of the device configuration process, or made available to the device configuration process as a separate set of information or data.

As discussed above, device configuration information may be based on or include one or more device profiles, such as a device hardware profile, a device network profile, a device benchmark profile, or a device physical location profile. Illustratively, these device profiles may be defined in a similar manner as the device profiles discussed earlier with regards to hardware qualification information. In one embodiment, device profiles associated with device configuration information may parallel device profiles associated with hardware qualification information corresponding to one or more device images. In another embodiment, device profiles associated with device configuration information may include different information than one or more device profiles associated with hardware qualification information. In a still further embodiment, device configuration information may include other information about physical computing device 104B in addition or as an alternative to the one or more device profiles.

Subsequent to the device configuration process determining device configuration information regarding the physical computing device 104B, the device configuration process may utilize the device configuration information to select a device image from the transferred set of device images. In one embodiment, the device configuration process may compare device configuration information corresponding to the physical computing device 104B to the hardware qualification information associated with the set of device images directly in order to identify a first set of one or more device images capable of running on the physical computing device 104B. In a further embodiment, the device configuration process may narrow the first set of one or more device images down to a second set of one or more device images by comparing additional device configuration information to the hardware qualification information associated with the set of device images.

The device configuration process may identify one, a subset, or all available device images on the basis of a comparison between device configuration information associated with physical computing device 104B and the hardware qualification information. In one embodiment, if the device configuration process identifies a set of more than one device image on the basis of the comparison between the device configuration information and the hardware qualification information, the device configuration process may cause the selection of one device image from the set of device images based upon additional device image selection criteria. The device image selection criteria may include, but is not limited to, a device image preference list giving a preference order in which to select device images, a real time or prior input from a device administrator (e.g., a network engineer, call center manager, or system administrator), data from a central provisioning server (e.g., an up to date preference list, or current network configuration or network load data), an unweighted or weighted probabilistic distribution between device images, or any other criteria which may assist the device configuration process in selecting a device image for physical computing device 104B.

Subsequent to the device configuration process selecting a device image for physical computing device 104A, the device configuration process may cause the selected device image to be loaded on physical computing device 104B.

With regard to the embodiments illustrated in FIGS. 2A, 2B, 2C, the loading of a selected device image occurs after the evaluation of the hardware qualification information and device configuration information. In an alternative embodiment, a device configuration process can include the selection and loading of a target device image followed by an evaluation of hardware qualification and device configuration information to verify the most appropriate device image was selected and loaded. In this alternative embodiment, the device configuration process can utilize historic information or statistical information to select a device image most likely to be selected. The historic information can be based on a history of previous transactions with regard to one or more users/customers. The statistical information can correspond to a wide range of statistical models, including a simplistic round robin or random selection to a weighted distribution, that attempt to identify (prior to an evaluation) what device image may be required/selected for given device configuration information. Thereafter, the processing of hardware qualification information and device configuration can proceed in a manner described above to determine whether the selected device image was appropriate. If so, the selected device image remains. If a different result is determined, the device configuration process can implement the provisioning of a different device image.

Figure 3:
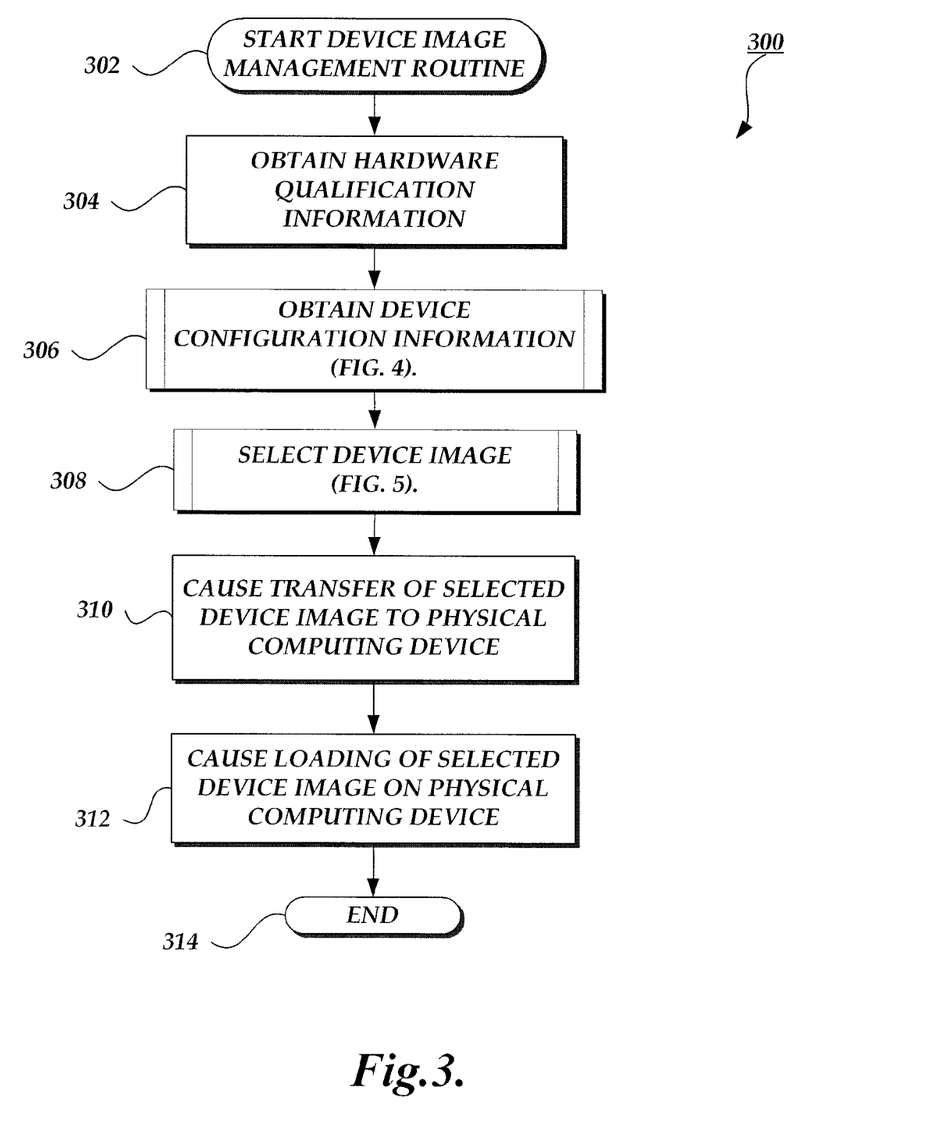
FIG. 3 is a flow diagram depicting an illustrative device image configuration management routine implemented by the device image manager shown in FIG. 1.

FIG. 3 is a flow diagram depicting an illustrative device image configuration management routine 300 implemented by device image manager 102 as described above with reference to FIG. 1. Routine 300 begins at block 302. Illustratively, routine 300 may be manually executed by a device administrator, or may be automatically executed in response to a predefined system event or as the result of a request or command by a device administrator.

At block 304, device image manager 102 obtains hardware qualification information for qualified device images. As described above with reference to FIG. 1, hardware qualification information may be associated with one or more device images, and may be based on one or more device profiles, such as a device hardware profile, device network profile, device benchmark profile, or device physical location profile. Hardware qualification information may alternately or additionally be associated with any other configuration information associated with one or more physical computing devices. In one embodiment, hardware qualification information may be generated or determined manually by an engineer or data center manager. As previously described, the initial hardware qualification information can be selected via an iterative process in which various device images or device image configurations are loaded on target computing devices and tested. The results of the testing can generate one or more device images or device image configurations that may be qualified for particular purposes. In another embodiment, the initial configuration and assembling of device images may be performed automatically or semi-automatically by an automatic provisioning process. Hardware qualification information may be obtained from a local data storage location (e.g., hard drive or USB drive), or obtained from a remote data storage location (e.g., transferred over network 110 of FIG. 1.

At block 306, device image manager 102 obtains device configuration information corresponding to a physical computing device. An illustrative description of a routine for obtaining device configuration information is provided below with reference to FIG. 4. At block 308, device image manager 102 selects a device image from a set of device images associated with hardware qualification information such as the hardware qualification information obtained in block 304. An illustrative description of a routine for obtaining device configuration information is provider below with reference to FIG. 5.

At block 310, device image manager 102 causes the transfer of the device image selected in block 308 to the physical computing device. In one embodiment, the selected device image may be stored on a remote storage device and transferred over network 110 of FIG. 1 to the physical computing device. In another embodiment, the selected device image may be stored on a local storage device associated or connected to physical computing device, such as a local hard drive or USB key. In one embodiment, device image manager 102 may cause the transfer of the selected device image directly by means of a process executing on the physical computing device. In another embodiment, device image manager may cause the transfer of the selected device image as the result of a command sent to the physical computing device, or any other means.

At block 312, device image manager 102 causes the loading of the selected device image on the physical computing device. In one embodiment, device image manager 102 may pass a reference, address, or pointer to a locally or remotely stored device image to a loading process running on the physical computing device. In another embodiment, device image manager 102 may manage the device image retrieval or loading process directly. Illustratively, the selected device image may be stored locally or remotely, by itself, or with a set of other device images. In one embodiment, loading the selected device image may require one or more reboots of the physical computing device. In another embodiment, the selected device image may be loaded using a fast reboot process or hot-swap process (e.g., kexec, etc.) that reduces or eliminates the need to reboot the physical computing device. For example, a hot-swap process may unload an existing system kernel from memory and load a new system kernel from the device image without rebooting. In a further embodiment, if the device image manager or other process obtains an error associated with a fast reboot or hot-swap process, device image manager or other process local to the physical computing device may cause the implementation of corrective actions, such as causing the reboot of the physical computing device, attempting additional fast reboots or hot-swaps, or switching to a different loading process (e.g., a slower loading process requiring one or more reboots). Additionally, the device image manager may implement a feedback mechanism to address the error condition. The routine 300 ends at block 314 with a device image loaded on the physical computing device.

As previously described, in an alternative embodiment, the device image manager 102 may select a device image using historical information, statistical information or other information as an educated guess as to the appropriate device image. Thereafter, the device image manager 102 can compare the device configuration information and hardware qualification information to determine whether the selected device image is the most appropriate or sufficiently appropriate. If so, the device image has already been configured and can continue to be implemented. Alternatively, the device image manager 102 can select one or more additional or alternative device images for implementation, such as through a hot swap process or reboot.

Figure 4:
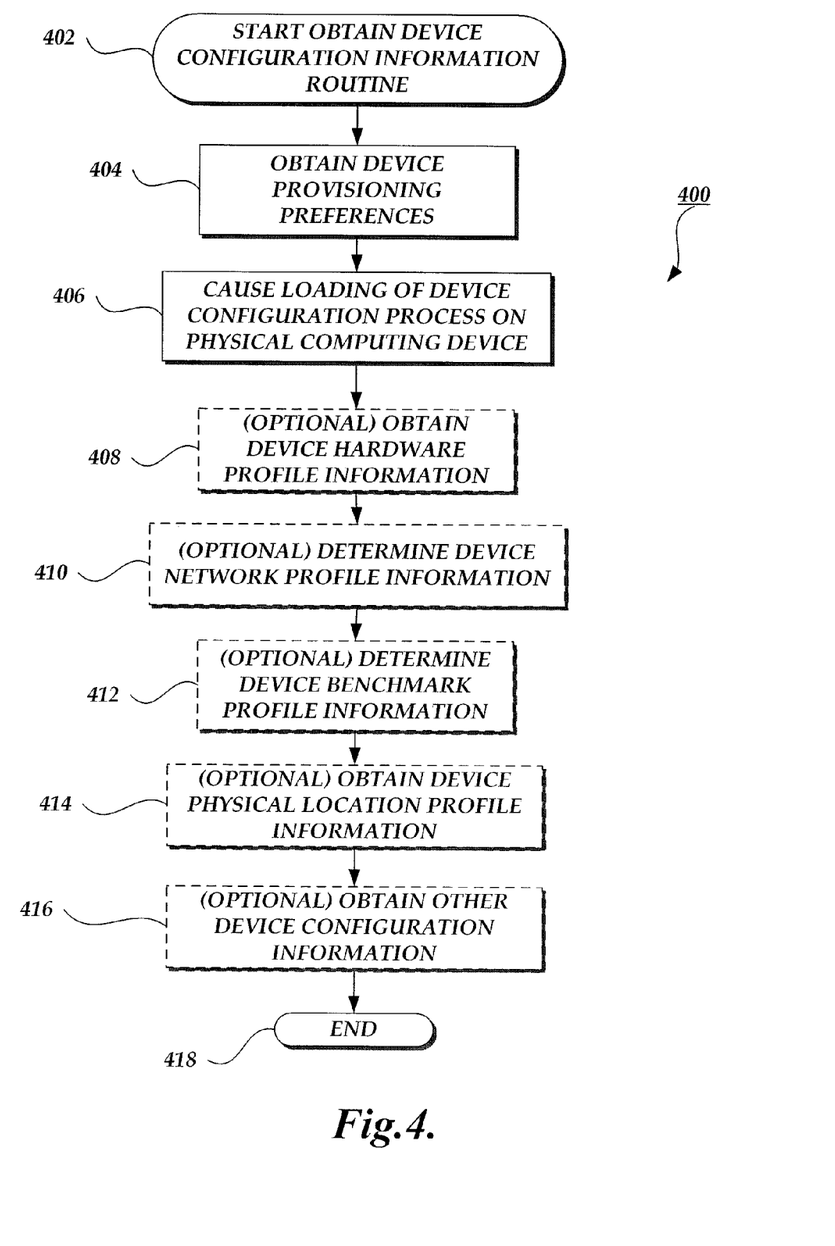
FIG. 4 is a flow diagram depicting an illustrative routine for obtaining device configuration information implemented by a device image manager.

FIG. 4 is a flow diagram depicting an illustrative subroutine for obtaining device configuration information implemented by device image manager 102 as shown in FIG. 1. Subroutine 400 begins at block 402. Illustratively, subroutine 400 may be manually executed by a device administrator, or may be automatically executed in response to a predefined system event or as the result of a request or command by a device administrator. For example, subroutine 400 may correspond to the step of obtaining device configuration information as described above with reference to block 306 of FIG. 3.

At block 404, device image manager 102 obtains device provisioning preferences to guide or influence the obtain device configuration information routine. Device provisioning preferences may include information identifying or interpretable to identify one or more profiles, types, or specific pieces of device configuration information for the device configuration process to obtain or determine. For example, device provisioning preferences may determine which of optional blocks 408-416 below are to be used in determining device configuration information. As a further example, device provisioning preferences may define or identify information to be incorporated or included in a device hardware profile, device network profile, device benchmark profile, or device physical location profile as described below in blocks 408, 410, 412, and 414 respectively, and may define or identify any other device configuration information to be obtained or determined in block 416 below. Illustratively, device provisioning preferences may be hardcoded or stored on a physical computing device, obtained from a remote or local storage location (e.g., a rack control device), or included or hardcoded within device image manager 102 or a device configuration process as described below with reference to block 406.

At block 406, device image manager 102 causes the loading of a device configuration process on a physical computing device. In one embodiment, device image manager 102 may transfer a device configuration process consisting of code or other executable information to the physical computing device. Illustratively, the device configuration process may be transferred from a remote device or location (e.g., over network 110 of FIG. 1), or may be transferred from a local storage device (e.g., a local hard drive or USB key). In another embodiment, a device configuration process may be preloaded or stored on the physical computing device, and device image manager 102 may transfer parameters or other configuration information to be used by the device configuration process, or may identify the local process or transfer nothing to physical computing device. Illustratively, the physical computing device may load the device configuration process automatically in response to the device configuration process being transmitted, or in response to a command or request by device image manager 102 or a device administrator. In one embodiment, loading the device configuration process may entail loading executable code from a local or network storage location. In a still further embodiment, device image manager 102 may be running in the local memory of physical computing device, and may simply start a device configuration subroutine or process locally. In a still further embodiment, a device configuration process may already be loaded into the local memory of physical computing device 104A, and device image manager 102 may cause the already-loaded process to execute.

Subsequent to being loaded on the physical computing device, the device configuration process may determine device configuration information associated with the physical computing device. In one embodiment, device configuration information may be based on or include one or more device profiles, such as a device hardware profile, device network profile, device benchmark profile, or device physical location profile described below in blocks 408, 410, 412, and 414 respectively, or other information such as described in block 416 below.

At block 408, the device configuration process running on behalf of device image manager 102 optionally obtains or determines device configuration information comprising device hardware profile information from the physical computing device. The decision whether to obtain or determine device hardware profile information may be based on or influenced by device provisioning preferences as described above with reference to block 404. Device hardware profile information associated with a hardware component of a physical computing device may include, but is not limited to, information inferred from or associated with a network interface controller (NIC), a central processing unit (CPU), a computing device basic input/output system (BIOS), computing device firmware, a motherboard, a daughterboard, an expansion board, a bus, a computer readable media drive, a memory, a storage device, a computer display, an input or output interface, a computing device enclosure, or any other hardware component associated with the physical computing device.

At block 410, the device configuration process running on behalf of device image manager 102 optionally obtains or determines device configuration information comprising device network profile information from the physical computing device. The decision whether to obtain or determine device network profile information may be based on or influenced by device provisioning preferences as described above with reference to block 404. Device network profile information may be obtained or inferred from a network configuration or other information associated with the physical computing device. Device network profile information may include, but is not limited to, information associated with logical location in a network or data center such as information associated or determined from a physical network address (e.g., MAC address), a network address associated with the physical computing device (e.g., a dynamic IP address or a static IP address), a subnet associated, a network gateway, a domain name server, a network location, a number of hops to a network location, routing information, a logical or physical device identifier, a rack identifier, a serial number or ID corresponding to one or more components of the physical computing device, a data storage location, information identifying a device image manager 102, or other information that may indicate or be used to infer a logical location.

At block 412, the device configuration process running on behalf of device image manager 102 optionally obtains or determines device configuration information comprising device benchmark profile information from the physical computing device. The decision whether to obtain or determine device benchmark profile information may be based on or influenced by device provisioning preferences as described above with reference to block 404. Device benchmark profile information may be obtained or inferred by testing the performance or requirements of one or more components or functionalities of a physical computing device. Device benchmark profile information may include, but is not limited to, information associated with one or more performance benchmarks of a physical computing device or physical computing device component, including but not limited to, processor performance; energy usage; bus speed; drive or data storage component throughput or seek time; network bandwidth, throughput, or latency to one or more remote or local network locations; or other benchmark data associated with the physical computing device.

At block 414, the device configuration process running on behalf of device image manager 102 optionally obtains or determines device configuration information comprising device physical location profile information from the physical computing device. The decision whether to obtain or determine device physical location profile information may be based on or influenced by device provisioning preferences as described above with reference to block 404. Device physical location profile information may be obtained or inferred from a network configuration or location or other information associated with the physical computing device. Device physical location profile information may include, but is not limited to, information associated with logical location in a network or data center such as information associated or determined from a physical network address (e.g., MAC address), a network address associated with the physical computing device (e.g., a dynamic IP address or a static IP address), a subnet associated, a network gateway, a domain name server, a network location, a number of hops to a network location, routing information, a logical or physical device identifier, a rack identifier, a serial number or ID corresponding to one or more components of the physical computing device, a data storage location, information identifying a device image manager 102, or other information that may indicate or be used to infer a physical location of the physical computing device.

At block 416, the device configuration process running on behalf of device image manager 102 optionally obtains or determines any other device configuration information associated with the physical computing device. The decision whether to obtain or determine other configuration information may be based on or influenced by device provisioning preferences as described above with reference to block 404. Other device configuration information may include any other type of device configuration information useful in selecting a device image, including but not limited to static information, such as information specifying that a device image selection routine should ignore hardware qualification information in selecting a device image for the physical computing device, or should always associate the physical computing device with a specific device image.

At block 418, subroutine 400 ends, having obtained device configuration information from the physical computing device. Illustratively, the device configuration information may be used to select a device image for the physical computing device as described in illustrative routine 300 of FIG. 3.

Figure 5:
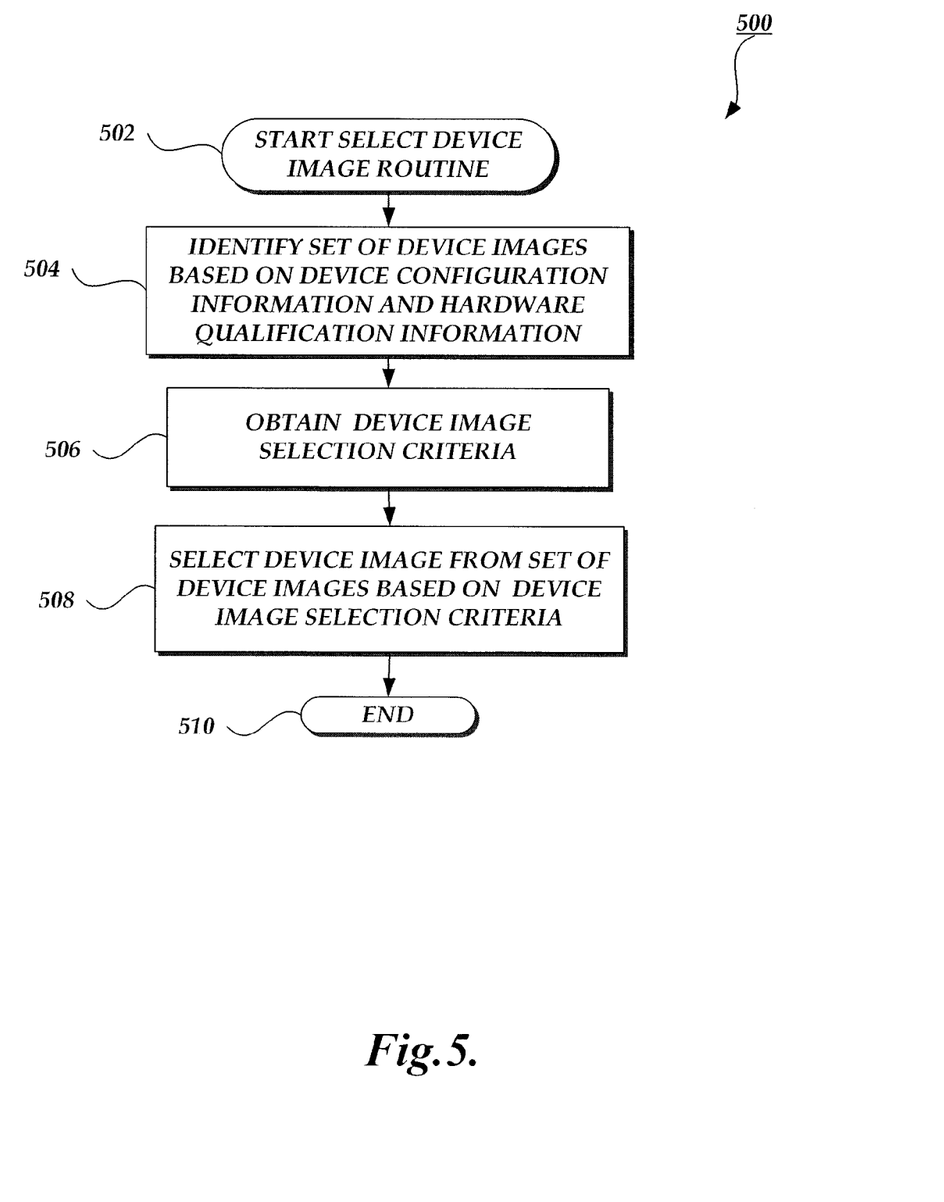
FIG. 5 is a flow diagram depicting an illustrative routine for selecting a device image implemented by a device image manager.

FIG. 5 is a flow diagram depicting an illustrative subroutine for selecting a device image implemented by device image manager 102 as shown above in FIG. 1. Subroutine 500 begins at block 502. Illustratively, subroutine 500 may be manually executed by a device administrator, or may be automatically executed in response to a predefined system event or as the result of a request or command by a device administrator. For example, subroutine 500 may correspond to the step of selecting a device image as described above with reference to block 308 of FIG. 3.

At block 504, device image manager 102 identifies a set of device images based on device configuration information corresponding to a physical computing device and hardware qualification information corresponding to one or more device images. Illustratively, device image manager 102 may compare device configuration information corresponding to a physical computing device to hardware qualification information associated with a group of device images to identify an initial set of device images that may run on the physical computing device. In one embodiment, the set may include all available device images. In an alternate embodiment, device image manager 102 may skip this initial determination entirely. Device image manager 102 may further compare additional device configuration information to hardware qualification information to narrow the initial set of device images down to a final set of device images most appropriate for the physical computing device.

At block 506, device image manager 102 obtains device image selection criteria. The device image selection criteria may include, but is not limited to, a device image preference list giving a preference order in which to select device images, an input from a device administrator (e.g., a network engineer, call center manager, or system administrator), data from a central provisioning server (e.g., an up to date preference list, or current network configuration or load data), an unweighted or weighted probabilistic distribution between device images, or any other criteria which may assist the device image manager 102 in selecting a device image for the physical computing device. Still further the device image selection criteria can include various types of business logic that facilitate the selection of device images, such as user inputs, evaluation of external information, and the like.

At block 508, device image manager 102 selects a device image from the final set of device images identified in block 504 based on the device image selection criteria. At block 510, subroutine 500 ends, having selected a device image from the set of device images. Illustratively, the selected device image may be obtained and loaded onto the physical computing device as described in illustrative routine 300 of FIG. 3 above.

It will be appreciated by those skilled in the art and others that all of the functions described in this disclosure may be embodied in software executed by one or more processors of the disclosed components and communications devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Any process descriptions, elements, or blocks in the flow diagrams described herein or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data or components described above may be stored on a computer-readable medium and loaded into memory of the computing device using a drive mechanism associated with a computer readable storing the computer executable components such as a CD-ROM, DVD-ROM, or network interface further, the component or data can be included in a single device or distributed in any manner. Accordingly, general purpose computing devices may be configured to implement the processes, algorithms and methodology of the present disclosure with the processing or execution of the various data or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing device images comprising:
   obtaining device provisioning preferences for provisioning a computing device for a predetermined functionality;
   obtaining device configuration information associated with the computing device based, at least in part, on the device provisioning preferences;
   identifying a device image from a set of one or more device images based, at least in part, on the device configuration information, wherein the device image includes a pre-generated configuration related to the predetermined functionality of the device image and wherein individual device images include different pre-generated configurations that cause instantiated device images to implement different functionalities; and
   causing loading of the device image on the computing device to implement the predetermined functionality.

2. The computer-implemented method of claim 1, wherein the predetermined functionality comprises at least one of database management, serving or distributing data, managing load balancing or network resources, managing network connectivity or security, providing network addressing information, or managing client or server redirection.

3. The computer-implemented method of claim 1, wherein the device provisioning preferences indicate at least one of a profile, type, or specific piece of the device configuration information to be obtained.

4. The computer-implemented method of claim 1, wherein the device configuration information is based on at least one of a device hardware profile, a device network profile, a device benchmark, or a device physical location profile associated with the computing device.

5. The computer-implemented method of claim 4, wherein the device hardware profile includes information associated with at least one of a network interface controller (NIC), a central processing unit (CPU), a computing device basic input/output system (BIOS), computing device firmware, a motherboard, a daughterboard, an expansion board, a bus, a computer readable media drive, a memory, a storage device, a computer display, an input or output interface, or a computing device enclosure.

6. The computer-implemented method of claim 4, wherein the device network profile includes information associated with at least one of a network address, a physical address, a subnet, a network gateway, a domain name server, a network location, a number of hops to a network location, routing information, a logical device group identifier, a control device identifier, a serial number or ID corresponding to one or more components of the computing device, or a data storage location.

7. The computer-implemented method of claim 4, wherein the device benchmark profile includes information associated with at least one of least one of a processor performance, an energy usage, a bus speed, a drive or data storage component throughput or seek time, a network bandwidth, a network throughput, or a network latency.

8. The computer-implemented method of claim 1, wherein at least one device image of the set of one or more device images includes at least one of a preconfigured operating system, software, or operating system configuration.

9. The computer-implemented method of claim 1, wherein individual device images of the set of one or more device images are associated with hardware qualification information.

10. The computer-implemented method of claim 9, wherein the hardware qualification information associated with individual device images is based on at least one of a device hardware profile, a device network profile, a device benchmark, or a device physical location profile associated with the computing device.

11. A system for managing device images comprising:
a memory component for storing a set of one or more device images for implementing one or more functionalities, wherein individual device images of the set of one or more device images are associated with hardware qualification information; and
a device image manager comprising one or more processors and in communication with the memory component and operable to:
  obtain device configuration information corresponding to a physical computing device based, at least in part, on device provisioning preferences for provisioning the physical computing device for a predetermined functionality; and
  select a subset of device images from the set of one or more device images based on a comparison between device configuration information and hardware qualification information associated with individual device images of the subset of device images; and
  cause loading of at least one device image of the subset of device images on the physical computing device to implement the predetermined functionality, wherein the at least one device image includes a pre-generated configuration related to the predetermined functionality and wherein individual device images include different pre-generated configurations that cause instantiated device images to implement different functionalities.

12. The system of claim 11, wherein the device image manager is further operable to:
  obtain device image selection criteria for selecting one or more device images for loading on the physical computing device, from the subset of device images; and
  select the at least one device image from the subset of device images based on the device image selection criteria.

13. The system of claim 12, wherein the device image selection criteria include at least one of a preference list, an input from a device administrator, data from a central provisioning server, or an unweighted or weighted probabilistic distribution between device images.

14. The system of claim 11, wherein the hardware qualification information associated with individual device images of the set of one or more device images is determined in an experimental setting.

15. The system of claim 14, wherein the hardware qualification information is determined during a manual assembling of its associated device image.

16. The system of claim 14, wherein the hardware qualification information is determined during an automatic assembling of its associated device image.

17. A non-transitory computer-readable medium storing computer-executable instructions that when executed by a processor perform operations comprising:
  obtaining device provisioning preferences for provisioning a computing device for a predetermined functionality;
  obtaining device configuration information associated with the computing device based, at least in part, on the device provisioning preferences;
  identifying a device image from a set of one or more device images based, at least in part, on the device configuration information, wherein the device image includes a pre-generated configuration related to the predetermined functionality of the device image and wherein individual device images include different pre-generated configurations that cause instantiated device images to implement different functionalities; and
  causing loading of the device image on the computing device to implement the predetermined functionality.

18. The non-transitory computer-readable medium of claim 17 further comprising verifying the loaded device image.

19. The non-transitory computer-readable medium of claim 18, wherein verifying the loaded device image is based on at least one of historical information or statistical information for selecting a most appropriate device image.

20. The non-transitory computer-readable medium of claim 18 further comprising identifying a second device image if the loaded device image is not verified.

* * * * *

UNITED STATES PATENT AND TRADEMARK OFFICE
CERTIFICATE OF CORRECTION

PATENT NO. : 9,515,882 B2
APPLICATION NO. : 14/262218
DATED : December 6, 2016
INVENTOR(S) : Eden G. Adogla Page 1 of 1

It is certified that error appears in the above-identified patent and that said Letters Patent is hereby corrected as shown below:

In the Specification

In Column 4 at Line 66, Change "may by" to --may be--.

Signed and Sealed this
Twenty-fifth Day of April, 2017

Michelle K. Lee
*Director of the United States Patent and Trademark Office*